United States Patent
Ovens

(10) Patent No.: US 8,958,945 B2
(45) Date of Patent: Feb. 17, 2015

(54) SYSTEM AND METHODS FOR MAINTAINING AND OPERATING AN AIRCRAFT

(75) Inventor: Norman Leonard Ovens, Ada, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 240 days.

(21) Appl. No.: 13/367,873

(22) Filed: Feb. 7, 2012

(65) Prior Publication Data

US 2013/0204487 A1 Aug. 8, 2013

(51) Int. Cl.
*B64F 5/00* (2006.01)

(52) U.S. Cl.
USPC ............... 701/33.2; 701/14; 701/538

(58) Field of Classification Search
CPC ........ B64D 11/00; B64D 43/00; B64D 45/00; B64D 47/00; B64D 47/08; B64D 2011/00; B64D 2045/00; B64D 2045/0035; B64D 2045/0075; B64D 2045/0085; B60R 2300/8006; G06K 7/1097; G06K 7/1098; G06K 9/00624; G06K 9/0063; G06K 9/00637; G06K 9/00664; G06K 9/00671; G06K 9/00677; G06K 9/00711; G06K 9/00832; G06K 9/20; G06K 9/2054; G06K 9/2063; G06K 9/2072; G06K 9/2081; G06K 9/22; G06K 9/228; G06K 9/3241; G06K 9/46; G06K 9/4604; G06K 9/4638; G06K 9/4642; G06K 9/4647; G06K 9/465; G06K 2009/20; G06K 2009/22; G06K 2009/3291; G06K 2017/0035; G06K 2017/0077; G06K 2017/0087; G06K 2017/0093; G06K 2017/0096; G06K 2209/03; G06F 3/005; G06F 17/30047; G07C 5/08; G07C 5/0825; G07C 5/0866; G07C 5/0891; G07C 5/12; G07C 5/0808; G07C 5/0816; G07C 5/084; G07C 7/00; B64F 5/00; B64F 5/0045

USPC ...................... 701/33.2, 538, 3–18
See application file for complete search history.

(56) References Cited

U.S. PATENT DOCUMENTS

| 7,124,953 | B2 | 10/2006 | Anttila et al. | |
|---|---|---|---|---|
| 7,620,484 | B1 | 11/2009 | Chen | |
| 7,739,007 | B2 | 6/2010 | Logsdon | |
| 2007/0237397 | A1* | 10/2007 | Johnson et al. | 382/209 |
| 2007/0273610 | A1 | 11/2007 | Baillot | |
| 2010/0152924 | A1* | 6/2010 | Pandit et al. | 701/3 |
| 2010/0214130 | A1* | 8/2010 | Weinmann et al. | 340/945 |
| 2010/0214411 | A1 | 8/2010 | Weinmann et al. | |
| 2012/0209470 | A1* | 8/2012 | Gilbert et al. | 701/31.4 |

FOREIGN PATENT DOCUMENTS

| WO | 2006011141 A2 | 2/2006 |
|---|---|---|
| WO | 2006130413 A2 | 12/2006 |
| WO | 2009026156 A1 | 2/2009 |

OTHER PUBLICATIONS

European Search Report and Written Opinion from EP Application No. 13154015.5 dated May 22, 2013.

* cited by examiner

*Primary Examiner* — Jerrah Edwards
(74) *Attorney, Agent, or Firm* — McGarry Bair PC

(57) ABSTRACT

A method of providing maintenance to an aircraft having multiple aircraft systems and a method of operating an aircraft having multiple aircraft systems, with at least some of the aircraft systems outputting one or more visual indicia indicative of a status of a system of the aircraft where the method provides information based on such visual indicia. An aircraft system for at least one of operating and maintaining the aircraft, which may retrieve information based on such visual indicia.

27 Claims, 4 Drawing Sheets

SYSTEM AND METHODS FOR MAINTAINING AND OPERATING AN AIRCRAFT

BACKGROUND OF THE INVENTION

Contemporary aircraft cockpits include a flight deck having various instruments and flight displays, which may display to the flight crew a wide range of aircraft, flight, navigation, and other information used in the operation and control of the aircraft. Such instruments and flight displays may also be used by a maintenance crew to diagnose faults and potential faults within a variety of aircraft systems. The amount of information available makes training for operation and maintenance of the system tedious, time consuming, and expensive. Often information may be overlooked or misinterpreted. Further, it is desirable to minimize the human effort involved in collecting and interpreting the data, and to minimize the aircraft equipment installation to accomplish these tasks.

BRIEF DESCRIPTION OF THE INVENTION

In one embodiment, an aircraft system for at least one of operation and maintaining an aircraft having multiple aircraft systems with at least some of the aircraft systems outputting a one or more visual indicia indicative of a corresponding status includes a database of information indexed according to visual indicia, a handheld device having a display and an imaging system creating an image of the visual indicia, and a computer program having an executable instruction set to process the image and identify the visual indicia from the image, retrieve corresponding information from the database for the identified visual indicia, and display the retrieved information on the display of the handheld device.

In another embodiment, a method of providing maintenance for an aircraft having multiple aircraft systems, with at least some of the aircraft systems outputting one or more visual indicia indicative of a corresponding health condition includes imaging the visual indicia with a handheld device, querying a database of maintenance information indexed by visual indicia for a match to the imaged visual indicia and displaying on the display of the handheld device the maintenance information for the matched visual indicia.

In yet another embodiment, a method of operating an aircraft having multiple aircraft systems, with at least some of the aircraft systems outputting one or more visual indicia indicative of a status of a system of the aircraft includes imaging the visual indicia with a handheld device, querying a database of operational information indexed by visual indicia for a match to the imaged visual indicia, and displaying on the display of the handheld device information for the matched visual indicia.

DESCRIPTION OF EMBODIMENTS OF THE INVENTION

Figure 1:
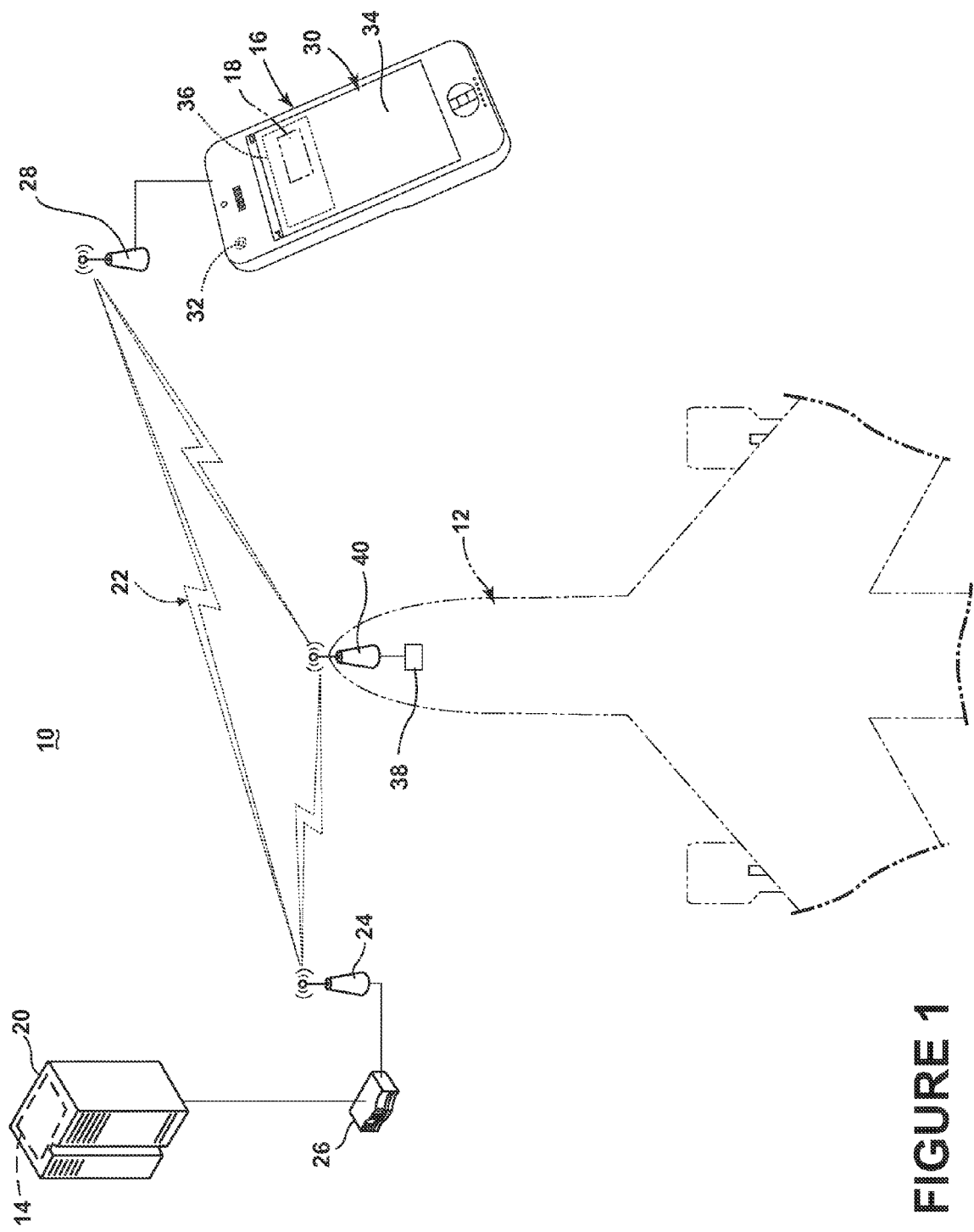
FIG. 1 is a schematic illustration of an aircraft system that may be used to operate and maintain an aircraft according to one embodiment of the invention.

FIG. 1 schematically illustrates an aircraft system 10 for operating and/or maintaining an aircraft 12 according to an embodiment of the invention. A database of information 14, a handheld device 16, and a computer program 18 may form the aircraft system 10. The aircraft system 10 may be used for operation and/or maintenance of the aircraft 12.

The database 14 may include a variety of information that may be indexed according to visual indicia. It is contemplated that such a database may be stored on a computer 20 and may be a computer searchable database. It will be understood that the database 14 may be any suitable database, including a single database having multiple sets of data, multiple discrete databases linked together, or even a simple table of data. Regardless of the type of database, the database 14 may be provided on storage medium on the computer 20. Alternatively, the database 14 may be provided on a computer readable medium, such as a database server. It is contemplated that the database 14 may include information relevant to maintenance of the aircraft and/or relevant to operation of the aircraft 12. It is alternatively contemplated that all or part of the database may reside on the handheld device 16 or on the aircraft 12.

By way of non-limiting example, the database 14 may include, among other information, maintenance information and/or operational information. Maintenance information may include a diagnostic tree, a repair or maintenance guide, replacement guide, repair instructions, part descriptions, etc. Operational information may include training information such as a pilot operational training aid or training guide, an operation tree, reference information, etc.

It is contemplated that the computer 20 may be remote from the handheld device 16 and the aircraft 12. For example, the computer 20 may be located at airline central maintenance or airline control. The computer 20 may be in communication with the handheld device 16 and/or the aircraft 12 over a communication network 22, which may include a wireless communication network. The computer 20 may include any suitable wireless communication link 24 capable of wirelessly linking with other systems and devices through the communication system 22 and may include, but is not limited to, packet radio, satellite uplink, Wireless Fidelity (WiFi), WiMax, AeroMACS, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to this invention, and later-developed wireless networks are certainly contemplated as within the scope of this invention. The computer 20 may be directly coupled with the wireless communication link 24 or may be indirectly coupled to the wireless communication link 24 through a secondary communication link 26, which may include an internet connection to couple the computer 20 to the communication system 22.

In order to be capable of wirelessly linking with other systems and devices through the communication system 22, the handheld device 16 may also include any suitable wireless communication link 28, which may include, but is not limited to, the previously described wired and wireless communication systems. It will also be understood that the particular type or mode of wireless communication is not critical to this invention, and later-developed wireless networks are certainly contemplated as within the scope of this invention.

A display 30 and an imaging system 32 for creating an image may also be included in the handheld device 16. It is contemplated that the display 30 may be a touch screen 34 such that a user may interact with the display 30 through the touch screen 34. While the handheld device 16 has been illustrated as a phone having a touch screen 34 it will be understood that the handheld device may be a scanner, PDA, tablet PC or other suitable device. A keyboard or cursor control may also be provided in the handheld device 16 to allow for user interaction with the display 30. The imaging system 32 may be any suitable imaging system capable of capturing an image. An exemplary imaging system may include a camera including a CCD camera, a CMOS camera, a digital camera, a video camera, or any other type of device capable of capturing an image.

A controller 36 may be included in the handheld device 16 and may be operably coupled to components of the handheld device 16 including the display 30, imaging system 32, touch screen 34, and wireless communication link 28. The controller 36 may include any suitable memory and processing units, which may be running any suitable programs to implement a graphical user interface (GUI) and operating system.

It is contemplated that all or part of the computer program 18 may reside on the handheld device 16. It is contemplated that the computer program 18 may be located within or be accessed by the controller 36. The computer program 18 may have an executable instruction set to process an image captured by the imaging system 32 and identify visual indicia from the image, retrieve corresponding information from the database 14 for the identified visual indicia, and display the information on the display 30 of the handheld device 16. In this manner, the image signal from the imaging system 32 may be received by the computer program 18 and processed. That is, the computer program 18 may analyze the image using pattern recognition techniques to determine characteristics of the image and determine what the image is of.

It is alternatively contemplated that all or part of the computer program 18 may reside on the computer 20 or on a second computer 38. The second computer 38 may be at the same location as the computer 20 or may be at an alternative location. As illustrated, it has been contemplated that the second computer 38 may even be located on the aircraft 12. Thus, it is contemplated that the handheld device 16 and the aircraft 12 may be in data communication. For example, the wireless communication link 28 of the handheld device 16 may be in communication with a wireless communication link 40 of the aircraft 12 to establish data communication. Alternatively, it is contemplated that the handheld device 16 may be communicably coupled with the aircraft 12 through a wired link without changing the scope of this invention.

Figure 2:
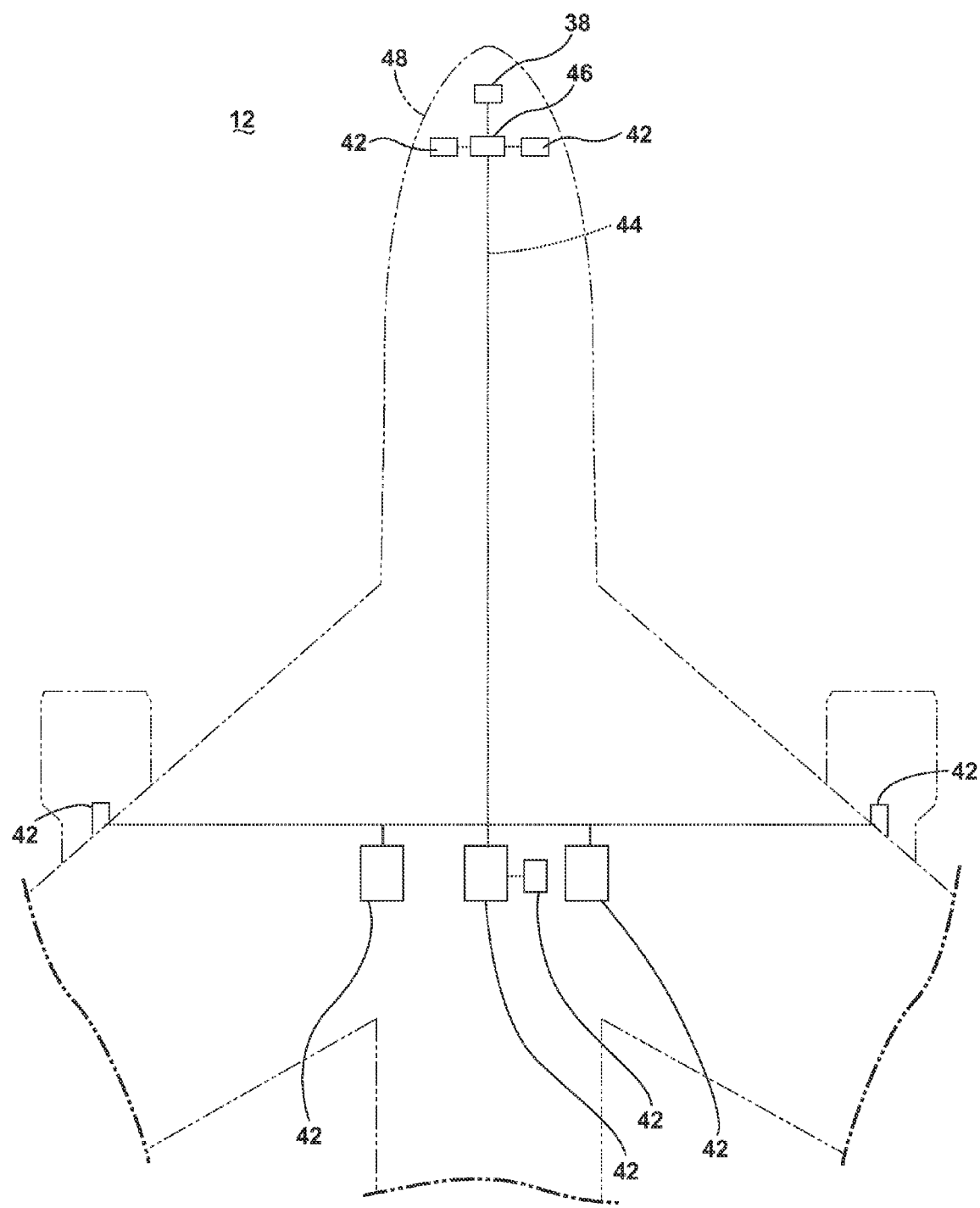
FIG. 2 is a schematic illustration of an aircraft, which may be used with embodiments of the invention.

During operation, the handheld device 16 may create an image of visual indicia and such visual indicia may include visual indicia displayed on a portion of the flight deck 46 of the aircraft 12. Thus, it may be helpful to understand additional information related to the aircraft 12. FIG. 2 schematically illustrates the aircraft 12 as having a plurality of aircraft systems 42 that enable proper operation of the aircraft 12 and a data network 44 over which the plurality of aircraft systems 42 may communicate with each other and provide information to a crew of the aircraft 12. For example, the aircraft systems 42 may output various information including visual indicia indicative of a corresponding health condition or operating condition of the aircraft 12 to a flight deck 46 located in a cockpit 48 of the aircraft 12.

Figure 3:
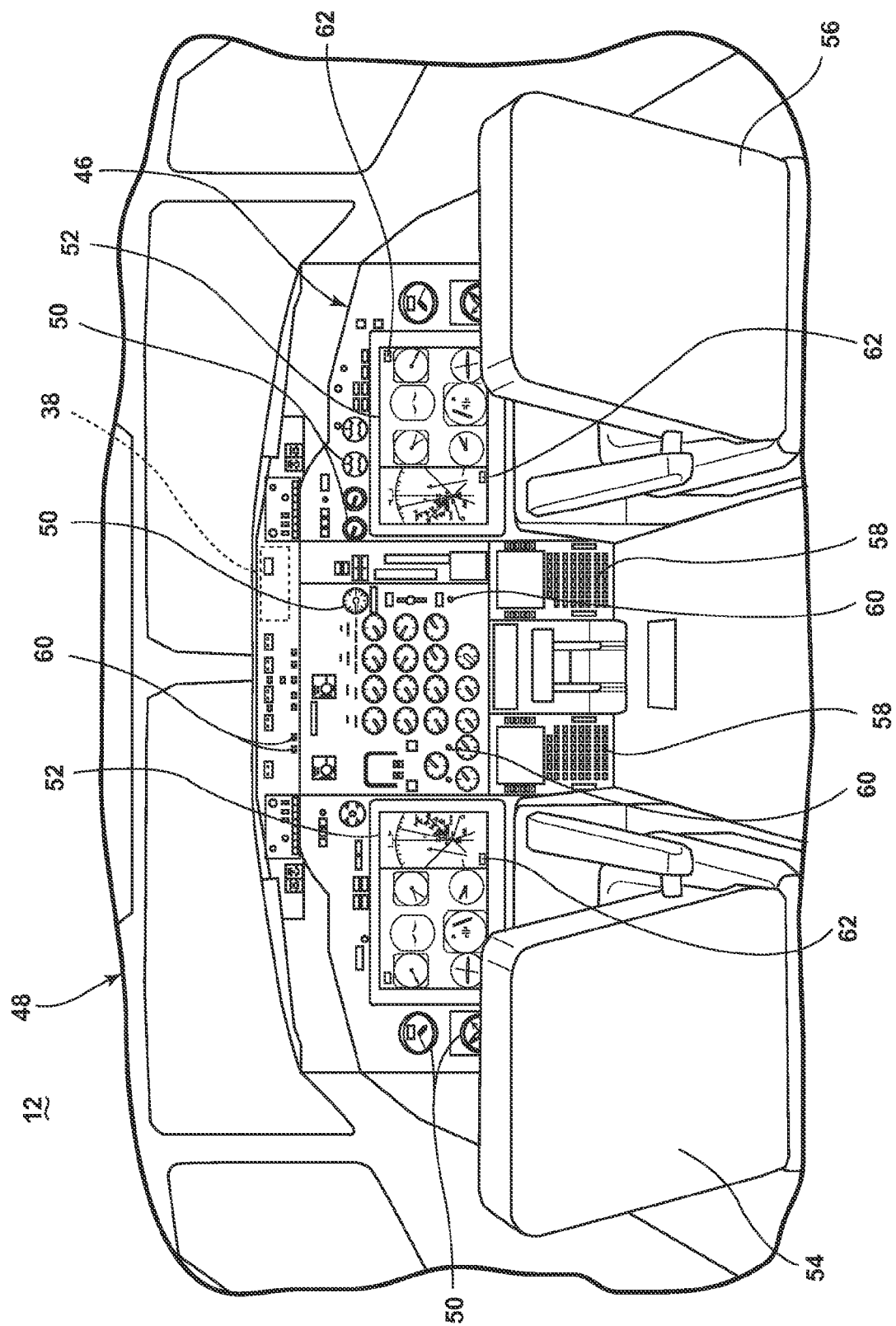
FIG. 3 is a perspective view of a portion of the cockpit better illustrating the flight deck of the aircraft of FIG. 2.

FIG. 3 illustrates a portion of the cockpit 48 of the aircraft 12 and is illustrated with an exemplary flight deck 46 having various instruments 50 and flight displays 52. A first user (e.g., a pilot) may be present in a seat 54 at the left side of the cockpit 48 and another user (e.g., a co-pilot) may be present at the right side of the cockpit 48 in a seat 56 and the flight deck 46 may be located in front of the pilot and co-pilot and may provide the flight crew with information to aid in operating the aircraft 12. The flight displays 52 may include either primary flight displays or multi-function displays and may display a wide range of aircraft, flight, navigation, and other information used in the operation and control of the aircraft 12. Further, both the various instruments 50 and flight displays 52 of the flight deck 46 may provide one or more visual indicia indicative of a corresponding health condition of one or more of the aircraft systems 42.

The instruments 50 and flight displays 52 may be laid out in any manner including having fewer or more instruments or displays. Further, the flight displays 52 need not be coplanar and need not be the same size. A touch screen display or touch screen surface (not shown) may be included in the flight display 30 and may be used by one or more flight crew members, including the pilot and co-pilot, to interact with the systems of the aircraft 12. Such touch screen surface may take any suitable form including that of a liquid crystal display (LCD) and may use various physical or electrical attributes to sense inputs from the flight crew. It is contemplated that the flight display 30 may be dynamic and that one or more cursor control devices (not shown) and/or one or more multifunction keyboards 58 may be included in the cockpit 48 and may be used by one or more flight crew members to interact with the systems of the aircraft 12. In this manner the flight deck 46 may be considered a user interface for the aircraft systems 42 and the aircraft 12.

The computer 38 or an additional computer or controller may be operably coupled to components of the aircraft 12 including the aircraft systems 42, flight displays 52, touch screen surfaces, cursor control devices, keyboards 58, etc. The computer 38 may also be connected with other controllers (not shown) of the aircraft 12. The computer 38 may include memory and processing units, which may be running any suitable programs to implement a graphical user interface (GUI) and operating system. The computer 38 may receive inputs from any number of aircraft systems 42 or software programs responsible for managing the acquisition and storage of data.

During operation of the aircraft 12, the multiple aircraft member systems 42 may send status messages or outputs regarding at least some of the operating data and/or health data of the multiple aircraft systems 42 such outputs may include one or more visual indicia indicative of information related to the aircraft system 42. Such visual indicia may be displayed on the flight deck 46. The visual indicia may be a variety of things including read outs and positions of various instruments 50, the activation of one or more lights or indicators 60 on the flight deck 46, and information illustrated on the flight displays 52. Further, the flight display 52 may be capable of producing one or more dynamic scannable barcodes 62 such as a QR-Code as the visual indicia of the aircraft system 42. Such a scannable barcode 62 may be dynamic such that variable amounts of data may be included in the scannable barcode 62. The visual indicia may also be a barcode or QR-code on the trim bezel of the display 52 or near an instrument 50 to identify that portion of the flight deck 46.

Figure 4:
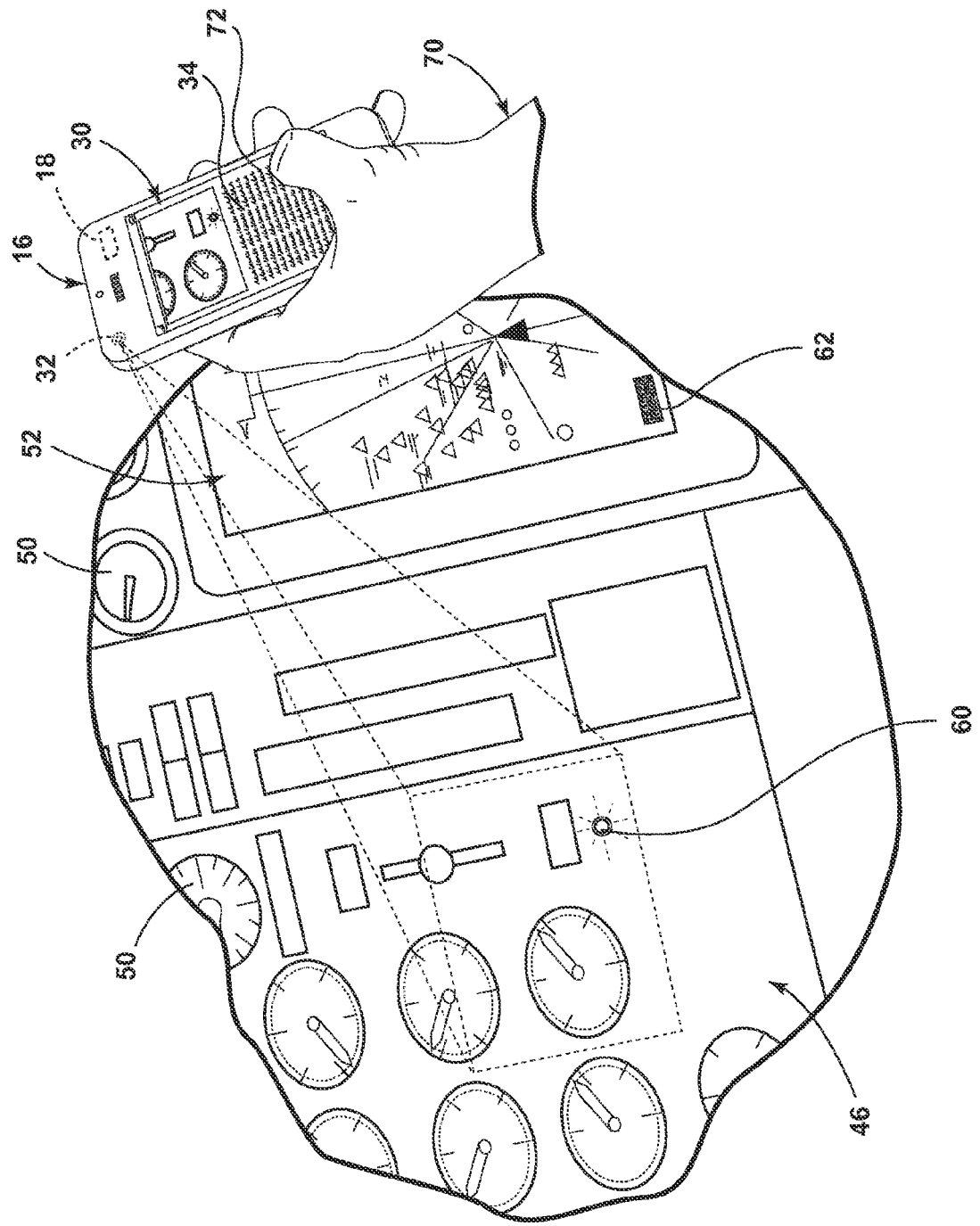
FIG. 4 is an enlarged view of a portion of the flight deck and a handheld device of the aircraft system of FIG. 1.

The technical effect of the aircraft system 10 is that it may be used as a system diagnostic tool, training aid, and/or automated reference source. During operation of the aircraft system 10, the handheld device 16 may be operated such that it visually scans or images portions of the flight deck 46. More specifically, as illustrated in FIG. 4, the handheld device 16 may be operated by a user 70 to capture an image of the flight deck 46 having the various visual indicia related to the aircraft systems 42. For example, the image is shown as capturing several instrument readings on the instruments 50 and the active indicator 60.

The computer program 18 may include software to process the image and identify the visual indicia on the flight deck 46 from the captured image. For example, pattern recognition may be used to identify system components of the flight deck 46, including the instruments 50 and indicator 60, by their shape, physical markings, and displayed outputs. It is contemplated that the computer program 18 running on the handheld device 16 may identify the aircraft system corresponding to the visual indicia from the image. The computer program 18 may identify system components based on scannable barcodes, or coded data transmitted via a dynamic barcode. Alternatively, the computer program 18 may recognize components by their shape. The computer program 18 may determine the visual indicia within the image including the actual system values and messages, indications, and mode states. It is contemplated that the computer program 18 may identify all visual indicia within the image. The computer program 18 may also determine physical part information, alphanumeric recognition, and/or ATA barcodes located on the flight deck 46.

The computer program 18 may then retrieve corresponding information from the database 14 for the identified visual indicia and display the corresponding information on the display 30 of the handheld device 16. This may be done by querying the database 14, which may be indexed by visual indicia, for a match to the imaged visual indicia. Such that the identified indicia may be matched with index of the visual indicia and the corresponding information for the matched visual indicia may be retrieved. It should be noted that the computer program 18 may be run on the computer 20 and in that case the handheld device 16 may only send the image to the computer 20 for remote processing on the computer 20. The computer 20 may then retrieve the appropriate information from the database 14. Regardless of where the processing is done, the information retrieved from the database 14 may then be displayed on the display 30 as schematically illustrated as 72. In this manner, the handheld device 16 and computer program 18 may act as an interpreter of aircraft system states based on visual indicia on the flight deck 46.

The aircraft system 10 described above may be used for maintaining an aircraft. In a method of providing maintenance for the aircraft 12 where at least some of the aircraft systems output visual indicia indicative of a corresponding health condition the visual indicia may be imaged with the handheld device 16. The database 14 may include maintenance information and it may be queried for a match to the imaged visual indicia and such maintenance information for the matched visual indicia may be displayed on the display of the handheld device 16. It is contemplated that the aircraft system 10 may be used to conduct tests or diagnose operational misunderstandings or identify systems faults accurately. The handheld device 16 may be used as a configuration tool for the recording and diagnosing systems installed on the aircraft 12. It is contemplated that the handheld device 16 may communicate with the computer 20, computer 38 or another computer or other device. The aircraft system 10 may be able to create summary reports to store on the aircraft 12, send to a remote location, print, or email when a path is available to it via the communication system 22.

The aircraft system may be used for a variety of functions including that the handheld device 16 may determine if a particular part or system of the aircraft is located on the aircraft and then determine if there is an upgrade/update is available and notify the operator or maintenance personnel regarding the same. The handheld device 16 may interact with the aircraft 12 and may interact with aircraft systems 42 to communicate various system data to a user. It is contemplated that the handheld device 16 may even query electronic part numbers reported by the aircraft system 42. Such part numbers may be embedded in software and/or hardware of the aircraft system 42.

It is also contemplated that the aircraft system 10 may act as a guide to various aircraft systems 42. That is, a user may use the handheld device 16 to recognize components, panels, displayed data, and symbology provided thereon. During such operation the handheld device 16 may be used to image the visual indicia, a database of operational information that is indexed by visual indicia may be queried for a match to the imaged visual indicia, and information for the matched visual indicia may be displayed on the display of the handheld. The technical effect is that the aircraft system 10 may provide instant access to text, and media regarding all aspects of the aircraft systems 42. By way of non-limiting example, the database of operational information may include wherein the information includes at least one of a training aid and reference information for the aircraft.

The handheld device 16 of the aircraft system 10 may be capable of acting as a guide to the user and may walk the user through scenarios step by step. More specifically, the user may image a portion of the flight deck 46 and the handheld device 16 may provide prompts based on the information available regarding the determined visual indicia. In this manner the user may scan portions of the aircraft 2 and follow prompts and perform various actions to operate portions of the aircraft 12 based on the provided information. The aircraft system 10 may recognize and interpret the state of the aircraft systems 42 based on visually scanning its system displays and control interfaces including that it may interpret the state of mode annunciations, pushbutton or indicator lit/unlit states, crew alert messages, and other system messages. As an example, the information queried from the database 14 may provide lists of actions that may be taken by the operator based on the state of the system. The display 22 of the handheld device 16 may inform the user about what to do next and may improve the ability for the user to understand and operate the aircraft systems 42.

The handheld device 16 may be in communication via the communication network 22 with airline central maintenance or airline control. For example, the handheld device 16 may include data about the type of the aircraft 12, the aircraft tail number, and data installed on the aircraft 12 and this data may be automatically updated on the handheld device 16 via a push to the handheld device 16 from the central data management for the aircraft operator. Alternatively, this information could be captured by the handheld device 16 such as by taking an image of the tail number, etc. Further, information gathered by the handheld device 16 and computer program 18 may be forwarded to the ground via the communication network 22. For example, scannable barcodes may be captured by the imaging system 32 and may include extensive information that may be used to make reports, which may be appended to crew electronic flight log reports, or maintenance reports.

The embodiments described above provide a variety of benefits including that they provide a means to have more verbose communication from the aircraft about what is potentially wrong with various aircraft systems. Further, object recognition reduces the amount of time that a user has to spend on a keyboard and reduces the exercise to an acceptance of the data presented by the machine instead of a verbose description and series of actions through expensive equipment such as custom aircraft controls or constrained equipment such as tiny keypads. The embodiments described above, provide real time tool to guide operator through steps to diagnose or operate the system. The ability for the handheld device 16 to recognize system components and automatically provide data about how to use them, their life cycle history, and any faults may reduce the time it takes to train an operator or maintenance personnel of the aircraft. The aircraft system 10 may gather data resulting in reduced false reports of faults and earlier remedy of problems due to more accurate capturing of data. The information interpreted by the aircraft system 10 is accurately interpreted and guarantees integrity of the data being received. The aircraft system 10 also may reduce the time to receive and record the data and minimize human error. The handheld device of the embodiments described above will provide a flexible interface that will be familiar to the user and as such devices are widely available the cost of implement such a system may be minimized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft system for operating or maintaining an aircraft having multiple aircraft systems with at least some of the aircraft systems outputting one or more visual indicia indicative of a corresponding status of one or more of the aircraft systems, the aircraft system comprising:
   a database of instructive information indexed according to the visual indicia indicative of the corresponding status of one or more of the aircraft systems;
   a handheld device having a display and an imaging system creating an image of the visual indicia; and
   a computer program having an executable instruction set to process the image and identify the visual indicia indicative of the corresponding status from the image including an actual system values message, an indication, a mode state, an alphanumeric, or a barcode and retrieve corresponding information from the database for the identified visual indicia indicative of the corresponding status of the one or more of the aircraft systems, and display the retrieved information on the display of the handheld device.

2. The aircraft system of claim 1, further comprising a computer, other than the handheld device, with the database being stored on the computer.

3. The aircraft system of claim 2 wherein the computer is remote from the handheld device and in communication with the handheld device over a communication network.

4. The aircraft system of claim 3 wherein all or part of the computer program may reside on the handheld device, the computer, or on a second computer.

5. The aircraft system of claim 1 wherein the information comprises maintenance information.

6. The aircraft system of claim 5 wherein the maintenance information comprises a diagnostic tree, which is displayed on the display of the handheld device.

7. The aircraft system of claim 5 wherein the maintenance information comprises a repair guide, which is displayed on the display of the handheld device.

8. The aircraft system of claim 1 wherein the handheld device and the aircraft are in data communication.

9. The aircraft system of claim 8 wherein the handheld device comprises a wireless communication system in communication with a wireless communication system of the aircraft to establish the data communication.

10. The aircraft system of claim 1 wherein the visual indicia indicative of a corresponding status of one or more of the aircraft systems comprises an indicia displayed on a display of one of the aircraft systems.

11. The aircraft system of claim 1 wherein a system component, outputting the one or more visual indicia indicative of a corresponding status, is an instrument or an indicator.

12. The aircraft system of claim 11 wherein the system component is identified by shape, physical marking, displayed output, or dynamic barcode.

13. A method of providing maintenance for an aircraft having multiple aircraft systems, with at least some of the aircraft systems outputting one or more visual indicia indicative of a corresponding health condition of one or more of the aircraft systems, the method comprising:
   imaging the visual indicia indicative of the corresponding health condition of one or more of the aircraft systems with a handheld device wherein the visual indicia is a read out of an instrument, a position of an instrument, an activation of an indicator, information illustrated on a flight display, or a barcode;
   querying a database of maintenance information indexed by the visual indicia for a match to the imaged visual indicia indicative of the corresponding health condition of one or more of the systems; and
   displaying on the display of the handheld device the queried maintenance information for the matched visual indicia.

14. The method of claim 13 wherein the imaging comprises capturing an image of a user interface of the aircraft system having the visual indicia indicative of the corresponding health condition of one or more of the systems.

15. The method of claim 14 wherein the visual indicia indicative of the corresponding health condition of one or more of the systems is displayed on a display of the user interface.

16. The method of claim 14 wherein the visual indicia indicative of the corresponding health condition of one or more of the systems is a light on the user interface.

17. The method of claim 14, further comprising identifying the visual indicia indicative of the corresponding health condition of one or more of the systems within the image.

18. The method of claim 17 wherein the matching matches the identified visual indicia indicative of the corresponding health condition of one or more of the systems with an index of the visual indicia.

19. The method of claim 17, further comprising identifying the aircraft system corresponding to the visual indication from the image.

20. The method of claim 17 wherein the image is at least part of a flight deck for the aircraft.

21. The method of claim 20, further comprising identifying all visual indicia indicative of the corresponding health condition of one or more of the systems within the image.

22. The method of claim 13, further comprising transmitting the imaged visual indicia indicative of the corresponding health condition of one or more of the systems to a computer remote of the handheld device and on which the database resides.

23. The method of claim 13 wherein the maintenance information comprises a diagnostic tree on the display of the handheld device.

24. The method of claim 13 wherein the maintenance information comprises a maintenance guide.

25. The method of claim 24 wherein the maintenance guide comprises a replacement guide.

26. A method of operating an aircraft having multiple aircraft systems, with at least some of the aircraft systems outputting one or more visual indicia indicative of a status of one or more of the systems of the aircraft, the method comprising:
   imaging the visual indicia indicative of the status of one or more of the systems of the aircraft with a handheld device;
   querying a database of operational information indexed by visual indicia for a match to the imaged visual indicia indicative of the status of one or more of the systems and where the visual indicia is an actual system values message, indication, mode state, alphanumeric, or a barcode; and
   displaying on the display of the handheld device the queried information for the matched visual indicia.

27. The method of claim 26 wherein the information includes a training aid or reference information for the aircraft.

* * * * *

UNITED STATES PATENT AND TRADEMARK OFFICE
CERTIFICATE OF CORRECTION

PATENT NO.          : 8,958,945 B2                                      Page 1 of 1
APPLICATION NO.     : 13/367873
DATED               : February 17, 2015
INVENTOR(S)         : Ovens It is certified that error appears in the above-identified patent and that said Letters Patent is hereby corrected as shown below:

In the Specification

In Column 6, Line 31, delete "aircraft 2" and insert -- aircraft 12 --, therefor.

In Column 6, Line 41, delete "display 22" and insert -- display 30 --, therefor.

Signed and Sealed this
Twenty-eighth Day of July, 2015

Michelle K. Lee
*Director of the United States Patent and Trademark Office*